United States Patent [19]
Smith

[11] 3,743,433
[45] July 3, 1973

[54] DRILL JIG APPARATUS
[75] Inventor: James P. Smith, Memphis, Tenn.
[73] Assignee: Robert O. Manspeaker, Memphis, Tenn. ; a part interest
[22] Filed: July 19, 1971
[21] Appl. No.: 163,903

[52] U.S. Cl..................................... 408/72, 408/97
[51] Int. Cl........................................... B23b 49/00
[58] Field of Search..................... 408/72, 72 B, 97, 408/98, 103, 115, 241; 33/189, 191

[56] References Cited
UNITED STATES PATENTS
| | | | |
|---|---|---|---|
| 1,119,470 | 12/1914 | Swantusch | 408/97 |
| 2,453,482 | 11/1948 | Woolson | 408/115 X |
| 1,093,029 | 4/1914 | Bowen | 408/97 |

FOREIGN PATENTS OR APPLICATIONS
| | | | |
|---|---|---|---|
| 590,005 | 7/1947 | Great Britain | 408/97 |
| 661,420 | 11/1951 | Great Britain | 408/72 |

Primary Examiner—Gil Weidenfeld
Attorney—John R. Walker, III

[57] ABSTRACT

An apparatus for holding a workpiece, e.g., a rod or conduit, in working proximity with a drill press or the like so that a plurality of precision aligned transverse holes may be drilled along the length of the workpiece with further assurance that the center line of the holes are coincident with a single longitudinal radial plane of the workpiece. The apparatus includes a substantially identical pair of alignment blocks having apertures therein for receiving the workpiece, i.e., one being a "reference" block and the other being a "slidably adjustable" block. The reference block includes structure for engaging and rigidly holding the workpiece. The adjustable block includes a plurality of accurately positioned drill guides of different sizes and is adapted to be positioned along the length of the workpiece at predetermined locations thereon for drilling the plurality of holes therein, i.e., regardless of the location at which the adjustable block is placed along the workpiece the centerline of the appropriate drill guide will consistently be accurately positioned for drilling the above-described precision aligned holes, providing the reference and adjustable blocks are resting upon a planar surface.

2 Claims, 6 Drawing Figures

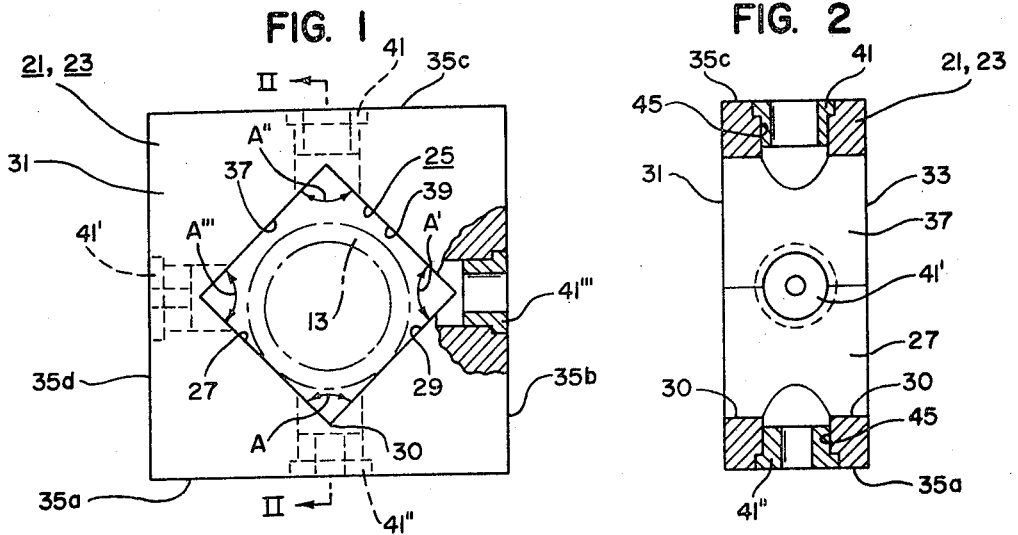
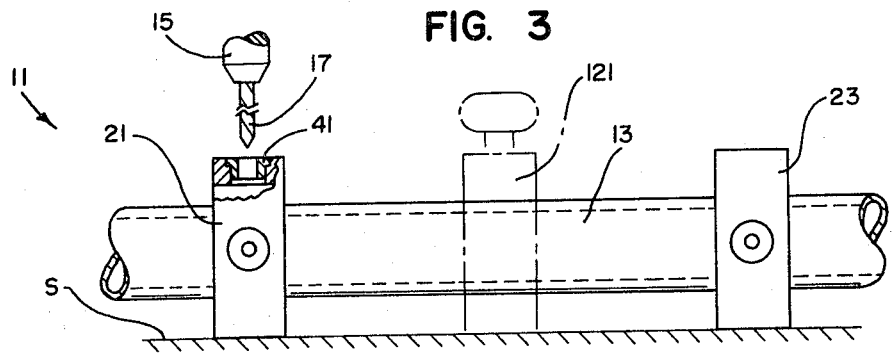
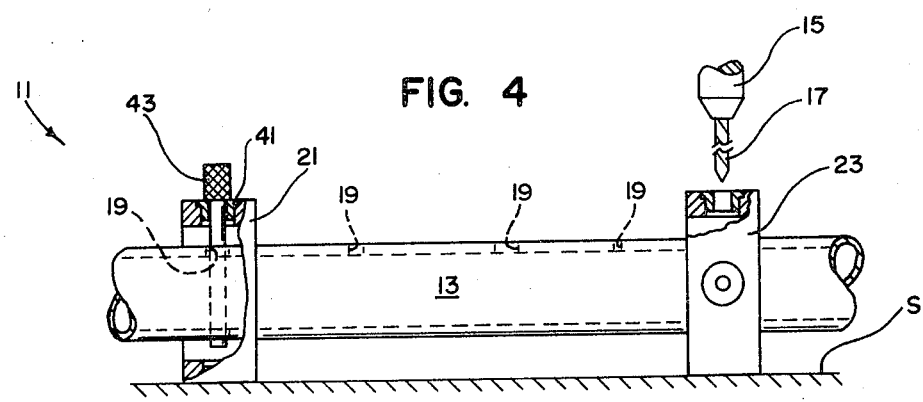
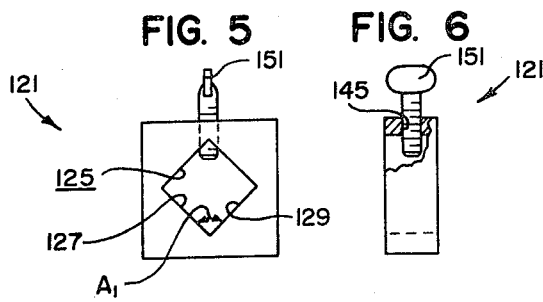

DRILL JIG APPARATUS

BACKGROUND OF THE INVENTION

1. Field of the Invention

This invention relates to work holding devices.

2. Description of the Prior Art

The usual practice in drilling holes in a workpiece, e.g., an elongated conduit or rod, is to rest the workpiece in a V-block which may include a horseshoe clamp for immobilizing the workpiece in the V-block. In the event a plurality of holes are desired in a straight line, i.e., traverse holes having their centerlines in a single longitudinal radial plane, along the length of the workpiece, a typical straight edge is employed to scribe a longitudinal straight line along the length of the workpiece. Transverse scribe lines are positioned along the length of the longitudinal scribed line at predetermined locations peculiar to the ultimate use of the workpiece. A center punch is used to impinge the workpiece at the plurality of intersections providing for a twist drill starting depression in the workpiece.

In other words, the holes are only as accurately placed as is the ability of the workman to properly sight the longitudinal scribed line precisely at the top dead center of the workpiece, the transverse scribed lines at exactly the proper spaced apart distance, and properly position the center punch when impinging the starting depression for the twist drill. It should be quite apparent to those skilled in the art that the above criteria is virtually impossible to achieve. However, assuming that the above criteria was precisely accomplished, the molecular structure of metal is such that twist drills tend to walk in a direction toward softer metal even when small pilot holes are first drilled therein. Accordingly, the holes usually are longitudinally tangential, i.e., parallel to a plurality of tangents to the surface, rather than longitudinally radial, i.e., along one of the radii, whether the workpiece be drilled with a drill press or with a portable freehand drilling device.

The environment for the majority of the workpieces is such that the above-described technique is acceptable. However, certain environments do not allow for such wide tolerances of accuracy, e.g., high pressure gas burners having an error greater than 1/10,000 of an inch is a problem. The usual practice in manufacturing these burners is to gang drill the gas iron blank workpiece with holes which receive bronze nozzles or the like which may be subsequently aligned so as to come within the established tolerance. This procedure is costly in material and labor. Additionally, an elaborate machine is required to precision align the jets, further adding to the cost in the production of high pressure gas burners.

A search was conducted which revealed the following two patents: The Hurd U.S. Pat. No. 190,042 and the Armstrong U.S. Pat. No. 1,109,952. The Hurd U.S. Pat. No. 190,042 pertains to a work holding device for drilling machines and the following quotes from the specification thereof are cited:

"My invention therefore consists, first, of a rotary adjustable drill-gig, which constitutes the blank-holder and drill-guide; second, in an index or angular guide to determine the exact angular position desired; third, in removable guide-bushings, which may be adapted to the various sizes of boring-tools employed...

Absolute truth of operation is not attainable; but it is possible to work within a margin of error practically inappreciable, and hence, for reasons hereinbefore stated, it is required that the boring shall not proceed from one side beyond center. The work must then be reversed and the boring recommenced on the opposite side".

The Armstrong U.S. Pat. No. 1,109,952 pertains to a saw guide for gas pipes. The structure of the U.S. Pat. No. 1,109,952 invention consists of a block which is provided with a hole for receiving a plurality of bushings which individually are compatible with a particular size pipe. The block is additionally provided with a cross slot in the front face thereof, and obviously is arranged at a right angle to the face and likewise to the hole which receives the pipe. This slot serves as the runway for a saw and intersects the hole at a depth sufficient to permit the saw to run through the pipe and allow it to be entirely cut off. Thus, the block may be positioned at predetermined locations along the pipe so that the pipe may be severed to a desirable length. An adjustable stop is also provided to form a flat bearing surface which in practice is seated against the wall or ceiling of a building from which the pipe to be cut projects.

Obviously, neither of the above patents solves the problem of providing a workpiece holding means for drilling a plurality of precision aligned transverse holes along the length of the workpiece with each of the centerlines of the holes being in a single longitudinal radial plane thereof.

SUMMARY OF THE INVENTION

The present invention is directed towards overcoming the disadvantages and problems associated with precision drilling a plurality of transverse holes along the length of a workpiece, i.e., each of the centerlines of the holes being in a single longitudinal radial plane of the workpiece.

The structure of the present invention includes a reference multi-lateral blocklike member and at least one similar slidably adjustable multi-lateral blocklike member. The reference and adjustable blocklike members are intended to be supported by a planar work surface typically associated with a boring means, e.g., a drill press or the like. Each of the blocklike members are provided with an aperture for loosely receiving the workpiece, e.g., when the multi-lateral blocklike members have four sides thereto, the aperture also preferably has four sides. The aperture is diagonally disposed with respect to the profile of the blocklike members, i.e., each apex of the angles formed by the aperture is adjacent one side of the blocklike member so that when the workpiece extends through the blocklike members, it is suitably aligned by engagement of circumferential portions thereof with adjacent sides of the aperture, i.e., the blocklike members suitably resting upon the planar surface.

The reference blocklike member includes means for engaging and rigidly holding the workpiece. The adjustable blocklike member includes at least one twist drill guide means having the centerline thereof extending perpendicular to the centerline of the aperture which receives the workpiece. The opening in the drill guide means intersects the aperture for guiding a twist drill directly in line with the longitudinal radial plane of the workpiece.

In other words, the aperture in the adjustable blocklike member is positioned therein so that the bisecting plane of the angle defined by two adjacent straight sides thereof is coincident with the centerline of the drill guide means. Additionally, the planes of the adjacent straight sides defining the aperture in the adjustable blocklike member are coincident with the planes of the straight sides defining the aperture of the reference blocklike member, i.e., when the reference and adjustable blocklike members are resting upon the planar work surface.

The adjustable blocklike member is adapted to be positioned along the length of the workpiece at predetermined locations thereon for drilling any number of transverse holes therein, i.e., the holes being in a single longitudinal radial plane of the workpiece.

BRIEF DESCRIPTION OF THE DRAWINGS

FIG. 1 is a front elevational view of one of the blocklike members of the present invention having a portion thereof broken away, showing a cross section of a workpiece or conduit in phantom.

FIG. 2 is a sectional view taken as on the line II—II of FIG. 1.

FIG. 3 is a side elevational view of a pair of the blocklike members of the present invention shown in a preferred environment with the workpiece extending through both members, also showing an alternate reference blocklike member in phantom and the members and workpiece being adjacent a drill press having a planar work surface and a twist drill.

FIG. 4 is a view similar to FIg. 3 showing one of the block members constituting a reference blocklike member by having a drift pin inserted therein for engaging and rigidly holding the workpiece thereto.

FIG. 5 is a front elevational view of the alternate reference blocklike member.

FIG. 6 is a side elevational view of the alternate reference blocklike member, having a portion thereof broken away.

DESCRIPTION OF THE PREFERRED EMBODIMENT

Referring first to FIGS. 3 and 4 of the drawings, wherein it may be seen that the apparatus 11 of the present invention is directed toward holding an elongated cylindrical workpiece 13, e.g., a rod or conduit, adjacent a drill press 15 or the like having a planar work surface S and a twist drill 17 for drilling a plurality of precision aligned transverse holes 19 along the length of the workpiece 13 with each of the centerlines of the holes 19 being in a single longitudinal radial plane of the workpiece 13.

The apparatus 11 generally comprises a reference multi-lateral blocklike member 21 and at least one slidably adjustable multi-lateral blocklike member 23. Each of the blocklike members 21, 23 are provided with an aperture 25 (FIG. 1) for loosely receiving the workpiece 13, i.e., each of the apertures 25 being defined in part by at least two adjacent straight sides 27, 29 disposed at an angle A of less than 180° for engagement by circumferential portions of the workpiece 13. It should be understood that the blocklike members 21, 23, as herein illustrated and disclosed include front and back sides 31, 33 and four substantially identical side portions 35a, 35b, 35c, and 35d. Also, it should be pointed out that the line of intersection 30 of the sides 27, 29 is parallel with side 35a. Additionally, the aperture 25 is defined by the two adjacent straight sides 27, 29 and two additional straight sides 37, 39, thus substantially defining a square having the angle A, an angle A', an angle A'', and an angle A'''. However, the blocklike members 21, 23, or more specifically, the front and back sides 31, 33 may be shaped to define a triangle, a pentagon, a hexagon, and/or other polygon figures with the respective apertures 25 therein having corresponding shapes thereto without departing from the spirit and scope of the present invention. The lines of intersection of the sides of the apertures forming the angles for engagement by circumferential portions of the workpiece 13 are parallel with the adjacent side portion of the blocklike members 21, 23 which rests upon surface S.

The reference blocklike member 21 includes means for engaging and rigidly holding the workpiece 13 thereto, i.e., including structure yet to be disclosed. The adjustable blocklike member 23 includes at least one twist drill guide 41 having the centerline thereof extending perpendicular to the centerline of the aperture 25, i.e., the drill guide 41 having an opening therein which intersects the aperture 25.

The aperture in the adjustable blocklike member 23 is positioned therein so that the bisecting plane of the angle A defined by the straight sides 27, 29 thereof is coincident with the centerline of the drill guide 41. Further, the planes of the straight sides 27, 29 respectively of the adjustable blocklike member 23 are coincident with the planes of the straight sides 27, 29 of the aperture 25 in the reference blocklike member 21, i.e., when the reference and adjustable blocklike members 21, 23 are resting upon the work surface S. The adjustable blocklike member 23 is therefore adapted to be positioned along the length of the workpiece 13 at infinite predetermined locations thereon for drilling any number of previously described holes 19 therein.

The means alluded to above for engaging and rigidly holding the workpiece 13 to the reference blocklike member 21 includes a drift pin 43 (FIG. 4) and the coacting twist drill guide 41. More specifically, the location along the length of the workpiece 13 is determined for the first hole 19 and the reference blocklike member 21 is positioned thereon so that the drill guide 41 is centered over the location for the first hole 19. The drill press 15 is then used in a typical manner to insert the twist drill 17 through the opening in the drill guide 41 (FIG. 3) to drill the first hole 19. It should be understood that the twist drill 17 may be allowed to extend on through the workpiece 13 so that opposite walls thereof are drilled or the twist drill 17 may be permitted to penetrate only one wall of the workpiece 13, i.e., depending upon the intended use or specifications for the workpiece 13.

The drift pin 43 is then removably received in the drill guide 41 and the first hole 19 in the workpiece 13 as best illustrated in FIG. 4 of the drawings. It should be appreciated by those skilled in the art that the drill guide 41 is positioned in the reference blocklike member 21 so that the bisecting plane of the angle A defining the aperture 25 therein respectively is coincident with the centerlines of the drill guide 41 of both the reference and adjustable blocklike members 21, 23. In other words, regardless of the location at which the adjustable blocklike member 23 is placed along the workpiece 13, the centerline of its drill guide 41 will consistently be accurately positioned to facilitate drilling any number of transverse holes 19 having their centerlines in a single longitudinal radial plane of the workpiece 13, i.e., provided the reference and adjustable blocklike members 21, 23 are resting on the work surfaces S or any other planar surface.

In order that the device 11 is readily adaptable to drill holes of different sizes in the workpiece 13, the reference and adjustable blocklike members 21, 23 preferably include a plurality of different size drill guides 41, e.g., the four-sided members 21, 23 as illustrated would include the aforementioned drill guide 41 and three additional drill guides 41', 41'', and 41'''. It should be understood that when the members 21, 23 have hexagonal shapes, additional surfaces are provided for accommodating additional drill guide means, etc., for other polygonally shaped members 21, 23.

In this regard, regardless of the shape of the blocklike members 21, 23, i.e., or the number of different size drill guides 41 therein, each of the aperture 25 is so shaped as to define a plurality of angles. More specifically, the aperture 25 is positioned in the adjustable blocklike member 23 so that the bisecting plane of any one of the above mentioned angles is coincident with the centerline of at least one of the different size drill guides 41. For example, the bisecting plane of the angle A' is coincident with the centerline of the drill guide 41', the bisecting plane of the angle A'' is coincident with the centerline of the drill guide 41'', and the bisecting plane of the angle A''' is coincident with the centerline of the drill guide 41''', etc., for other polygonally shaped members 21, 23.

Accordingly, the aperture 25 for the reference blocklike member 41 is constructed and so positioned that the bisecting plane of any one of the plurality of angles thereof is coincident with the centerline of at least one of the different size drill guides of both the reference and adjustable blocklike members 21, 23. In other words, the construction characteristics of the reference blocklike member 21 preferably are substantially identical with the construction characteristics of the adjustable blocklike member 23, as above disclosed.

From the above disclosure, it should now be apparent to those skilled in the art that when the reference blocklike member 21 has square front and back sides 31, 33, the adjustable blocklike member 23 preferably has substantially identical square front and back sides 31, 33, etc., for other polygonally shaped front and back sides 31, 33.

Accordingly, the workpiece 13 is supported by at least one reference blocklike member 21 and at least one substantially identical adjustable blocklike member 23, i.e., corresponding circumferential portions thereof engaging corresponding surfaces of substantially identical apertures 25. It should be understood that the spaced apart distance of the blocklike members 21, 23 is limited, i.e., the distance being a variable depending upon the rigidity of the workpiece 13. In other words, an exceptionally long workpiece 13, e.g., 18 or 20 ft., would have a tendency to bend when supported at only two points. In this event, additional adjustable blocklike members preferably are positioned at random intervals along the length of the workpiece 13 to assure that the longitudinal axis of the workpiece 13 remains parallel with the planar surface S.

From FIG. 4 of the drawings, it may be seen that the workpiece 13 may be provided with a plurality of different size transverse holes 19 with each of the centerlines thereof being in a single longitudinal radial plane of the workpiece 13. In other words, in the event no more than four different size transverse holes 19 are desired, the blocklike members 21, 23 preferably have a shape substantially as depicted in the drawings and as above disclosed. The desired size holes 19 is selected by placing the appropriate side thereof upon the surface S, e.g., the side 35b contiguously engaging the surface S presents the drill guide 41' to the drill press and twist drill 15, 17, etc., for the remaining sides 35c, 35d and drill guides 41'', 41'''. In the event five different size holes are desired in the workpiece 13, the reference and adjustable blocklike members 21, 23 preferably have the front and back sides thereof and the apertures therein pentagonally shaped and precisely positioned as previously disclosed, etc., for additional numbers of different size holes 19.

However, it should be understood that any number of reference and/or adjustable blocklike members 21, 23 may be provided to cover the spectrum of different size holes, i.e., two reference and/or adjustable blocklike members 21, 23 having only four different drill guides each would include a variety of eight different size drill guides and three would include a variety of twelve drill guides, ad infinitum.

In this regard, it should be understood that the drill guides 41 –41''' constitute a well known bushing of hardened steel or the like which are press-fitted into suitable apertures 45. Accordingly, the individual drill guides 41 may be removed from their apertures 45 and other size drill guides 41 installed therein.

It should be understood that while only only one drift pin 43 is illustrated, a variety of different size drift pins 43 are included in the present invention, i.e., a separate size drift pin for each size drill guide 41.

In the event a hole is desired in the workpiece 13 radially displaced 180° from the holes 19 as depicted in FIG. 4, the reference blocklike member 21 may be rotated about the centerline of the aperture 25 so that the side 35c thereof contiguously engages the surface S. It should be understood that the surface S is provided with a socket for receiving the knurled protruding portion of the drift pin 43. Subsequently thereto, the adjustable blocklike member 23 may be positioned along the length of the workpiece 13 so that any number of holes may be drilled along the length thereof radially disposed 180° thereon from the hole having the drift pin 43 extending therein.

Referring now to FIGS. 3, 5 and 6 of the drawings, wherein it may be seen that an alternate embodiment is included with the drill jig apparatus 11 of the present invention, which pertains to the means for engaging and rigidly holding the workpiece to the reference blocklike member. Accordingly, the apparatus 11 includes an alternate reference blocklike member 121. The reference blocklike member 121 is provided with a bore 145 which is directed towards and intersects an aperture 125 therein, i.e., the bore 145 intersecting the aperture 125 adjacent a point opposite the apex of an angle $A_1$, i.e., the angle $A_1$ corresponds to the angle A defined by the straight sides 27, 29 of the aperture 25 in the reference blocklike member 21, as fully disclosed in the principal embodiment above. In other words, the angle $A_1$ is defined by a pair of adjacent straight sides 127, 129 of the aperture 125.

The alternate reference blocklike member 121 includes a set screw 151 which is threaddedly received in the bore 145 and may be manually turned inwardly into the aperture 125 so that the innermost end thereof frictionally engages the workpiece 13, i.e., rigidly holding the workpiece 13 to the alternate reference blocklike member 121. Accordingly, the adjustable blocklike member 23 as above disclosed in the principal embodiment may be used in the identical fashion in conjunction with the reference blocklike member 121, i.e., positioned along the length of the workpiece 13 at predetermined locations thereon for drilling the precision aligned transverse holes 19 having their centerlines in a single longitudinal radial plane of the workpiece 13.

It should be understood that the planes of the straight side 127, 129 respectively are coincident with the planes of the straight sides 27, 29, i.e., when the reference blocklike member 121 and the adjustable blocklike member 23 are resting upon the work surface S. Accordingly, the reference blocklike member 121 preferably is shaped substantially identical to the adjustable blocklike member 23, i.e., if the adjustable blocklike member 23 has five sides as does the aperture 25 therein, the reference blocklike member 121 would likewise have five sides as would the aperture 125 therein, etc., for other polygonally shaped members 23, 121.

Although the invention has been described and illustrated with respect to preferred embodiments thereof, it is not to be so limited since changes and modifications may be made therein which are within the full intended scope of the present invention.

I claim:

1. An apparatus for holding an elongated cylindrical workpiece adjacent boring means having a planar work surface and a twist drill for drilling a plurality of precision aligned transverse holes along the length of said workpiece with each of the center lines of the holes being in a single longitudinal radial plane of the workpiece, said apparatus comprising a reference multilateral blocklike member and at least one slidably adjustable multilateral blocklike member, each of said blocklike members being provided with an aperture for loosely receiving the workpiece, each of said apertures being defined in part by at least two adjacent straight sides disposed at an angle of less than 180° for engagement by circumferential portions of the workpiece to be drilled, said reference blocklike member including means for engaging and rigidly holding the workpiece thereto, said adjustable blocklike member including at least one twist drill guide means having the center line thereof extending perpendicular to the center line of said aperture, said drill guide means having an opening therein which intersects said aperture, said aperture in said adjustable blocklike member being positioned therein so that the bisecting plane of said angle defined by the said two straight sides thereof is coincident with the center line of said drill guide means and the planes of said straight sides thereof respectively being coincident with the planes of said straight lines of said aperture in said reference blocklike member when said reference and adjustable blocklike members are resting upon the work surface, and said adjustable blocklike member being adapted to be positioned along the length of the workpiece at predetermined locations thereon for drilling said plurality of holes therein, said means for engaging and rigidly holding the workpiece to said reference blocklike member including drift pin means and coacting twist drill guide means, said drift pin means being removably received in said drill guide means for reception in the first of said plurality of holes being drilled in the workpiece and said drill guide means being positioned in said reference blocklike member so that the bisecting plane of said angle partially defining said aperture therein respectively is coincident with the center lines of said drill guide means of said reference and said adjustable blocklike members, said adjustable blocklike member including a plurality of different size drill guide means and said aperture therein is so shaped as to define a plurality of angles, said aperture being positioned in said adjustable blocklike member so that the bisecting plane of any one of said plurality of angles is coincident with the center line of at least one of said different size drill guide means.

2. The apparatus of claim 1 in which said reference blocklike member includes a plurality of different size drill guide means and said aperture therein is so shaped as to define a plurality of angles, said aperture being positioned in said reference blocklike member so that the bisecting plane of any one of said plurality of angles is coincident with the center line of at least one of said different size drill guide means of said reference and said adjustable blocklike members.

* * * * *